Nov. 26, 1968  I. T. SWARTWOOD ET AL  3,412,887

PLASTIC BOTTLE

Filed Feb. 7, 1967  3 Sheets-Sheet 1

INVENTORS
IRA T. SWARTWOOD
WEBB C. JENNINGS
BY
Teare, Teare & Sammon
ATTORNEYS

Nov. 26, 1968     I. T. SWARTWOOD ET AL     3,412,887
PLASTIC BOTTLE
Filed Feb. 7, 1967     3 Sheets-Sheet 2

INVENTORS
IRA T. SWARTWOOD
WEBB C. JENNINGS
BY
*Teare, Teare & Sammon*
ATTORNEYS Nov. 26, 1968   I. T. SWARTWOOD ET AL   3,412,887
PLASTIC BOTTLE Filed Feb. 7, 1967   3 Sheets-Sheet 3

INVENTORS
IRA T. SWARTWOOD
WEBB C. JENNINGS

BY
*Teare, Teare & Sammon*
ATTORNEYS

United States Patent Office 3,412,887
Patented Nov. 26, 1968

3,412,887
PLASTIC BOTTLE
Ira T. Swartwood, 548 Edinborough Drive, Bay Village, Ohio 44140, and Webb C. Jennings, 75 Kensington Oval, Rocky River, Ohio 44116
Filed Feb. 7, 1967, Ser. No. 614,428
18 Claims. (Cl. 215—100)

ABSTRACT OF THE DISCLOSURE

A plastic bottle having a body with an open top and having trunnions integral with the bottle and projecting from opposite sides thereof. A handle is pivotally mounted on the bottle while means are provided for releasably holding the handle in downward position while allowing it to be released when it is lifted to a carrying position above the bottle.

Background of the invention

*Field of the invention.*—The invention pertains to plastic containers, such as milk bottles, having a handle pivotally mounted thereon.

*Description of the prior art.*—Certain types of bottles particularly milk bottles of the returnable type must be so designed as to have a smooth uninterrupted interior surface to minimize the opportunity for bacteria to lodge within the container. Additionally, for large containers, such as the gallon size, a handle is usually provided for carrying purposes. One form of container, such as Patent No. 3,285,454, has had the handle molded integrally with the container and extending across the top of it. Such construction, however, interferes with the normal functioning of the bottle washing machine. This problem has been solved in the present invention by providing trunnions which are integral with the body and by pivotally mounting the handle on the trunnion, with the provision of means for holding the handle in a lowered position, yet enabling the handle to be released when lifted above the top of the bottle in the carrying position.

Summary

A plastic bottle embodying the present invention can readily be inserted into the pocket of a bottle washing machine without in any way interfering with the operation of the machine. During such operation, the handle will be held in the downward position. In such location the handle will not interfere with the normal operation of filling the container at a subsequent station, nor will it interfere with the capping operation. Subsequently, however, the handle may be released automatically by a user in the art of raising the handle to carrying position.

An object of the invention is to provide various ways by means of which the handle may be retained in bottle washing position upon the bottle and by means of which the handle can be freely moved from the bottle washing to the carrier position in an expeditious manner.

Brief description of the drawings

Referring to the drawings.

Description of the preferred embodiments

Figure 3:
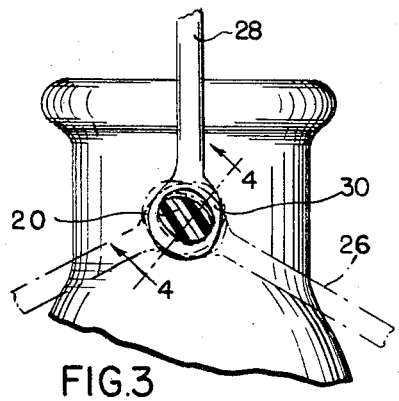
FIG. 3 is a section taken on a plane indicated by the line 3—3 in FIG. 2.
Figure 4:
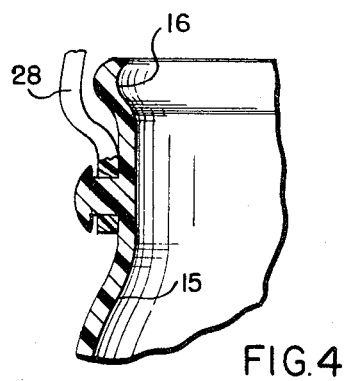
FIG. 4 is a section taken on a plane indicated by the line 4—4 in FIG. 3.

The various drawings show a portion of the bottle which has a body 10, a neck 11 and a top 12. The body, as shown in FIG. 4, has a smooth and uninterrupted interior surface 15 and may have a recessed annular groove 16 for receiving the customary cap structure. The body is preferably made by a blow-molding operation of plastic material, such as polyvinyl chloride, and has trunnions 20 extending outwardly from opposite sides of the neck portion and integral therewith. In the form shown in FIGS. 1 to 4 each trunnion has an elliptical cross section and a head. As shown in FIG. 3 the major axis of the ellipse is inclined to the horizontal preferably to such extent that it is coincident substantially with the axis of the handle arm 25, when the handle is in a lowered position, on either side of the bottle, as shown at 26 in FIG. 3.

Figure 1:
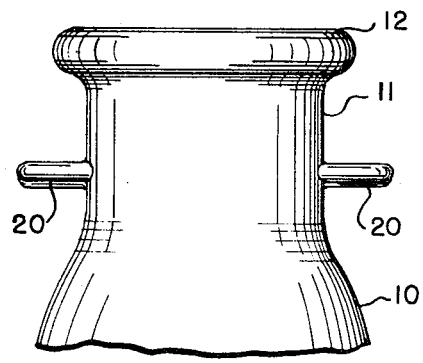
FIG. 1 is a front view of a part of a bottle having trunnions molded integrally with the bottle.
Figure 2:
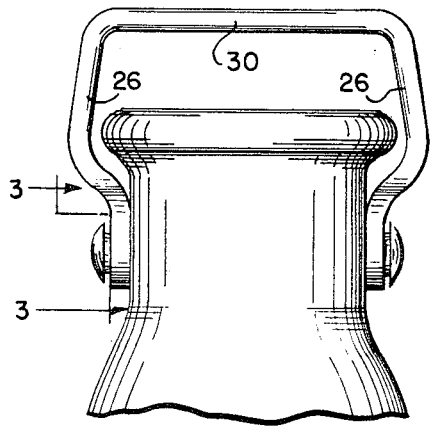
FIG. 2 is a view similar to FIG. 1 but having heads formed upon the trunnions and having a handle carried by the trunnions.

The preferred form of handle has a finger grip portion 30 which connects the arms 26 and which is adapted to extend across the top of the bottle as shown in FIG. 2 when moved to the upright or carrying position. The ends of the arms opposite the finger grip portion are provided with openings 30 which in the form of FIG. 3 are substantially complementary to the cross sectional shape of the trunnion. As shown in FIGS. 3 and 4, there is clearance between the trunnions and the walls of the openings sufficient to allow the handle to be swung upwardly to the full line position 28 of FIG. 3. During such movement, the handle being also made of plastic material, such as polyvinyl chloride, will have sufficient resiliency to enable it to be turned around the trunnions without fracture. Thus in the form of FIG. 3 the handle is yieldably restrained against upward movement to the full line position of FIG. 3. Such restraint is caused by frictional engagement between the trunnions and the walls of the handle openings. Assembly of the handle over the trunnion heads may readily be made by first immersing the handle arms in warm water until the material is softened sufficiently to be stretched over the heads.

Figure 5:
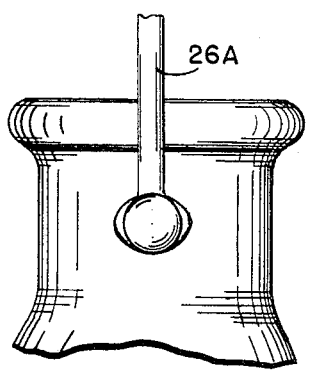
FIG. 5 is a side view of a modified form of handle construction.
Figure 6:
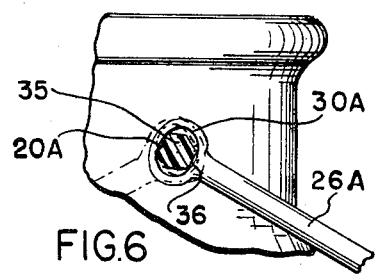
FIG. 6 is a side partial view of the bottle of FIG. 5 and having a trunnion shown in section.
Figure 7:
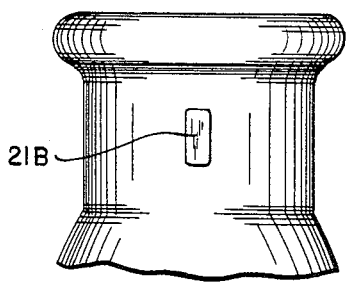
FIG. 7 is a view showing the top portion of a bottle having a modified form of trunnion construction.
Figure 8:
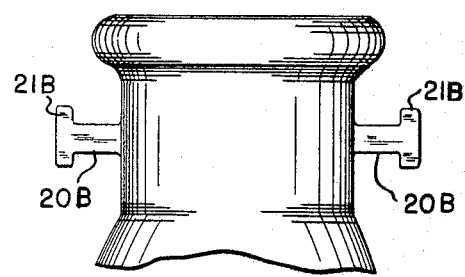
FIG. 8 is a view taken at a right angle to that illustrated in FIG. 7.
Figure 9:
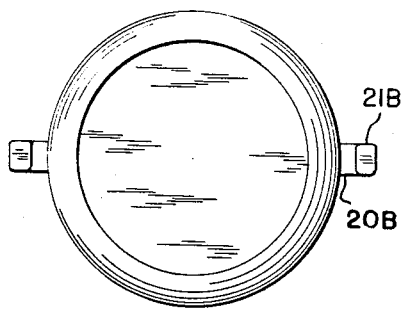
FIG. 9 is a top plan view of the modification of FIGS. 7 and 8.

In FIGS. 5 and 6 a modified form of construction is illustrated,, wherein the trunnion is indicated at 20A as having a hexagonal cross-section and wherein the opening 30A in the arm 26A is elliptical. The trunnion is shown as having the longest cross-sectional line disposed at right angles to the axis of the arm 26A, in lowered position whereby opposite flat surfaces 35 and 36 of the trunnion will be engaged by the flattest portions of the opening 30A. Such arrangement will operate to hold the handle in downward position and yet will enable it to be readily released for movement from the downward position in FIG. 6 to the upward position of FIG. 5. In the form of FIGS. 5 and 6 the handle may be held in lowered position on each side of the bottle.

Figure 10:
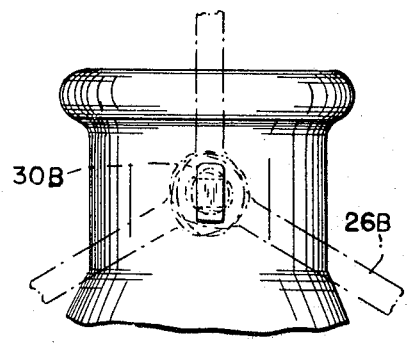
FIG. 10 is a partial view of a bottle showing the application of a handle to the modification of FIGS. 7 to 9.

In FIGS. 7 to 10 a further modification is illustrated, wherein the trunnions are indicated at 20B as being rectangular in cross-sectional shape and as having heads 21B which are also rectangular in cross-sectional shape. In this modification, the handle opening 30B is shown in FIG. 10 as being elliptical in shape. Such construction enables the handle to be moved to the downward position, as indicated at 26B and to be retained in such position by the spreading of the wall of the opening 30B so as to engage the trunnion on its longest cross-sectional dimension.

Figure 11:
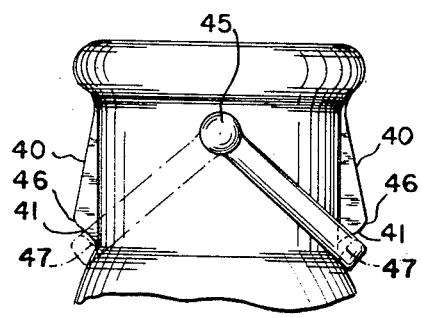
FIG. 11 is a view showing the upper portion of a bottle and having a modified form of means for releasably holding the handle in lowered position on the bottle.

The modification of FIG. 11 utilizes a rib 40 on each side of the bottle. The rib is formed integrally with the bottle and may extend downwardly and outwardly from the neck of the bottle. Each rib terminates in a shoulder 41 which may be engaged by the finger grip portion of the handle and which thus operates to retain the handle in the downward position. The distance from the axis 45 of the trunnion to the point 46 on the rib 40 is longer than the distance between the axis 45 and the inner surface 47 of the hand grip portion, whereby normally the handle is restrained against movement upwardly but there is sufficient flexibility in the handle to enable it to be lifted over the shoulder for raising it to the carrying position. This arrangement also allows the handle to be positioned on either side of the bottle in the downward position.

Figure 12:
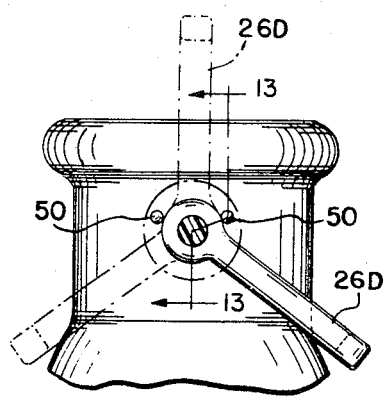
FIG. 12 shows a further modification of means for retaining the handle in the lowered position.
Figure 13:
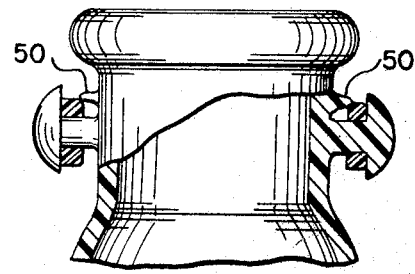
FIG. 13 is a section taken on a plane indicated by the line 13—13 of FIG. 12 with part of the bottle being shown in elevation.

In the modification of FIGS. 12 and 13 the bottle is provided with integral protuberances 50 which are disposed outwardly of and above the trunnions for engagement with the upper surface of the arm 26D. Such engagement is, as shown in FIG. 13, only on the tip portions of the protuberances so as to resist upward movement of the handle. Such resistance, however, is insufficient to prevent upward movement whenever the handle is grasped and lifted for movement into carrying position, as shown by the broken lines 26D in FIG. 12. Preferably there are two such projections indicated at 50 in FIG. 12 on each side of the bottle so that the handle can be held in downward position on either side of the bottle.

Figure 14:
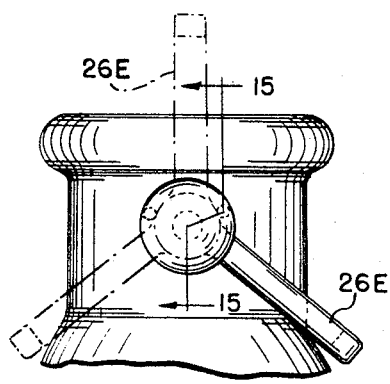
FIG. 14 is a side view of a further modified form of handle retaining structure.
Figure 15:
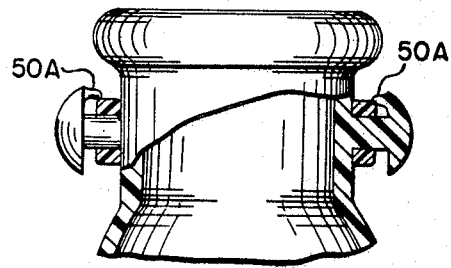
FIG. 15 is a section taken on the plane indicated by the line 15—15 of FIG. 14.
Figure 16:
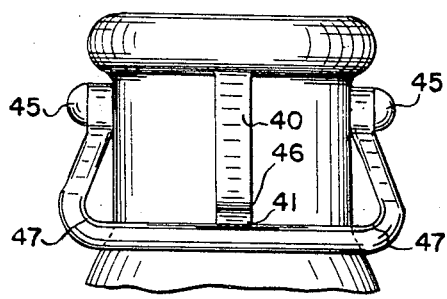
FIG. 16 is a view showing the top portion of a bottle and as viewed at right angles to that shown in FIG. 11.

In the modification of FIGS. 14 and 15 protuberances similar to those of FIGS. 12 and 13 are utilized, but instead of being on the bottle, they are mounted on the trunnion heads, as indicated at 50A. In such position they function to restrain inadvertent upward movement of the handle 26E but still permit the handle to be lifted to the position indicated in the broken line position 26E during the normal act of lifting the handle to move it to the carrying position. In this modification the handle can also be retained in lowered position on either side of the bottle.

We claim:

1. A plastic bottle comprising a hollow body, a reduced neck on said body and having an axial opening in the outer end thereof, the inner surface of said neck being continuous and uninterrupted, a pair of trunnions integral with the body and extending outwardly therefrom adjacent the neck of the bottle, a handle pivotally mounted on said trunnions, said handle comprising a one-piece plastic member and being adapted to occupy a position selectively either below the level of the trunnions or above the top of the bottle, and means associated with the bottle and adapted to act upon the handle to restrain it against movement when the handle is in one position but operating to release it when the handle is moved to another position, said restraining means comprising a pair of abutments which operate to hold the handle when it is disposed in lowered position on either side of the bottle, each trunnion having a head integral therewith and the abutments being integral with the head and projecting inwardly toward the bottle.

2. A plastic bottle comprising, a hollow body, said body having an integral reduced neck at the top thereof, said neck having an opening communicating with the interior of said body, a pair of oppositely disposed trunnions made integral with and extending laterally outwardly from opposed sides of said neck and having a generally noncircular shape in vertical section, a handle mounted on said trunnions for pivotal movement about a generally horizontal axis, said handle including a one-piece plastic member disposed on said trunnions for relative pivotal movement from a noncarrying position below the level of the trunnions to a generally upright carrying position above the level of said trunnions, the plastic member having opposed openings of generally noncircular shape through which extend said trunnions, and said trunnions having exterior engagement surfaces disposed for relative camming coacting engagement with the confronting interior marginal surface of said openings so as to frictionally restrain movement of said handle when pivoted in a direction from one of said positions toward the other of said positions for frictionally holding the handle in said latter position.

3. A plastic bottle in accordance with claim 2, wherein said handle is frictionally restrained when pivoted in a direction from said noncarrying position toward said carrying position so as to be frictionally held in place in said carrying position.

4. A plastic bottle in accordance with claim 2, wherein said handle is frictionally restrained when pivoted in a direction from said carrying position toward said noncarrying position so as to be frictionally held in place in said noncarrying position.

5. A plastic bottle in accordance with claim 2, wherein the initial shape of said openings in one of said positions corresponds generally to the corresponding cross-sectional shape of said trunnions, and wherein said initial shape is adapted to be resiliently deformed into a different shape upon pivotal movement of the handle into the other of said positions.

6. A plastic bottle in accordance with claim 5, wherein said trunnions and said openings are noncircular in cross-sectional shape having a major and minor axis, and the major axes of said trunnions and the associated openings being disposed substantially coincidental with one another when the handle is disposed in the position below said trunnions.

7. A plastic bottle in accordance with claim 6, wherein the minor axes of said trunnions are disposed substantially normal to the general plane of said handle when the latter is in the position below said trunnions.

8. A plastic bottle in accordance with claim 6, wherein said trunnions are elliptical in cross-section.

9. A plastic bottle in accordance with claim 6, wherein said trunnions are polygonal in cross-section.

10. A plastic bottle in accordance with claim 9, wherein said trunnions are parallel sided quadrilaterals in cross-section.

11. A plastic bottle for liquids or the like, comprising, a hollow body, said body having an integral reduced neck at the top thereof, said neck having an opening communicating with the interior of said body, a pair of oppositely disposed trunnions made integral with and extending laterally outwardly from opposed sides of said neck, said trunnions each having a headed portion adjacent its outer end and each trunnion being noncircular in vertical cross-section between the respective head and its juncture with said neck, a handle mounted for pivotal movement on said trunnions about a generally horizontal axis, said handle including a one-piece plastic member disposed on said trunnions for relative movement from a noncarrying position below the level of the trunnions to a carrying position above the level of the trunnions and vice versa, the plastic member having a noncircular opening at each of its ends and said openings having a greater area as compared to the corresponding cross-sectional area of said trunnions, said trunnions being disposed through the respective openings and having exterior engagement surfaces adapted for relative coacting engagement with confronting interior marginal surfaces of said openings so as to resiliently deform the material of said handle for restraining movement of said handle upon its pivotal movement on said trunnions in a direction from below the level of said trunnions to the said carrying position above the level of said trunnions for frictionally holding said handle in said carrying position.

12. A plastic bottle in accordance with claim 11, wherein the material of said plastic handle is progressively resiliently deformed upon pivotal movement into said carrying position above the level of said trunnions.

13. A plastic bottle comprising, a hollow body, a reduced neck made integral with said body and having an opening communicating with the interior of said body, a pair of oppositely disposed trunnions made integral with and extending laterally outwardly from opposed sides of said neck, a handle mounted on said trunnions for pivotal movement about a horizontal axis, the handle including a one-piece plastic member disposed for selective movement from a noncarrying position below the level of the trunnions to a carrying position above the level of the trunnions, and the neck including integral abutments extending outwardly therefrom adapted for coacting engagement with said handle member for restraining movement of said handle when in one of said positions.

14. A plastic bottle in accordance with claim 13, wherein said abutments comprise a pair of ribs made integral with and on opposite sides of the neck of said bottle adapted to deformably engage the mid-portion of the handle member for restraining it in said position below said trunnions.

15. A plastic bottle in accordance with claim 13, wherein said ribs are of an elongated construction extending generally vertically with respect to the neck of said bottle and in oppositely disposed relation between said trunnions.

16. A plastic bottle in accordance with claim 15, wherein said ribs extend downwardly and outwardly from the neck terminating in shoulders, and the distance from the central axis of said trunnions to a point on said shoulders which are adapted to engage the inner surface of the mid-portion of said bottle member is greater than the distance between said central axis and the inner surface of the mid-portion of said handle member.

17. A plastic bottle in accordance with claim 13, wherein said abutments comprise a pair of protuberances disposed on at least one side of said neck and in spaced relation above the level of said trunnions to hold said handle when it is disposed in the noncarrying position on either side of said bottle.

18. A plastic bottle in accordance with claim 17, wherein each trunnion has a head integral therewith, and said protuberances projecting outwardly and in spaced relation relative to said head.

References Cited

UNITED STATES PATENTS

| | | | |
|---|---|---|---|
| 2,652,054 | 9/1953 | Bishop | 215—100 |
| 3,100,576 | 8/1963 | Frank | 215—100 |
| 3,275,366 | 9/1966 | Hidding | 215—100 |

FOREIGN PATENTS 631,678  11/1961  Canada.

DONALL F. NORTON, *Primary Examiner.*